June 10, 1924.

W. G. MOLAND

MACHINE FOR MAKING CRUCIBLES

Filed July 27, 1921    3 Sheets-Sheet 1

Inventor:
William G. Moland,
By Jas. C. Nobensmith
Attorney.

June 10, 1924.
W. G. MOLAND
MACHINE FOR MAKING CRUCIBLES
Filed July 27, 1921
1,497,190
3 Sheets-Sheet 2
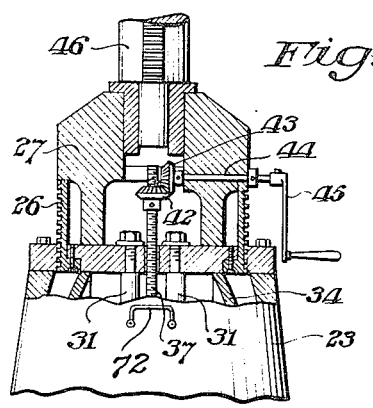
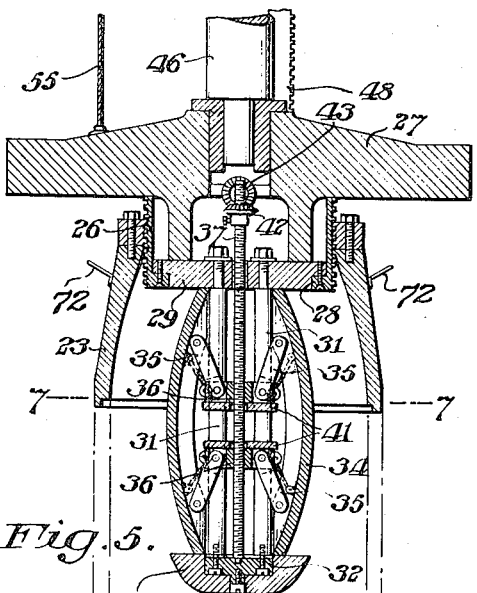
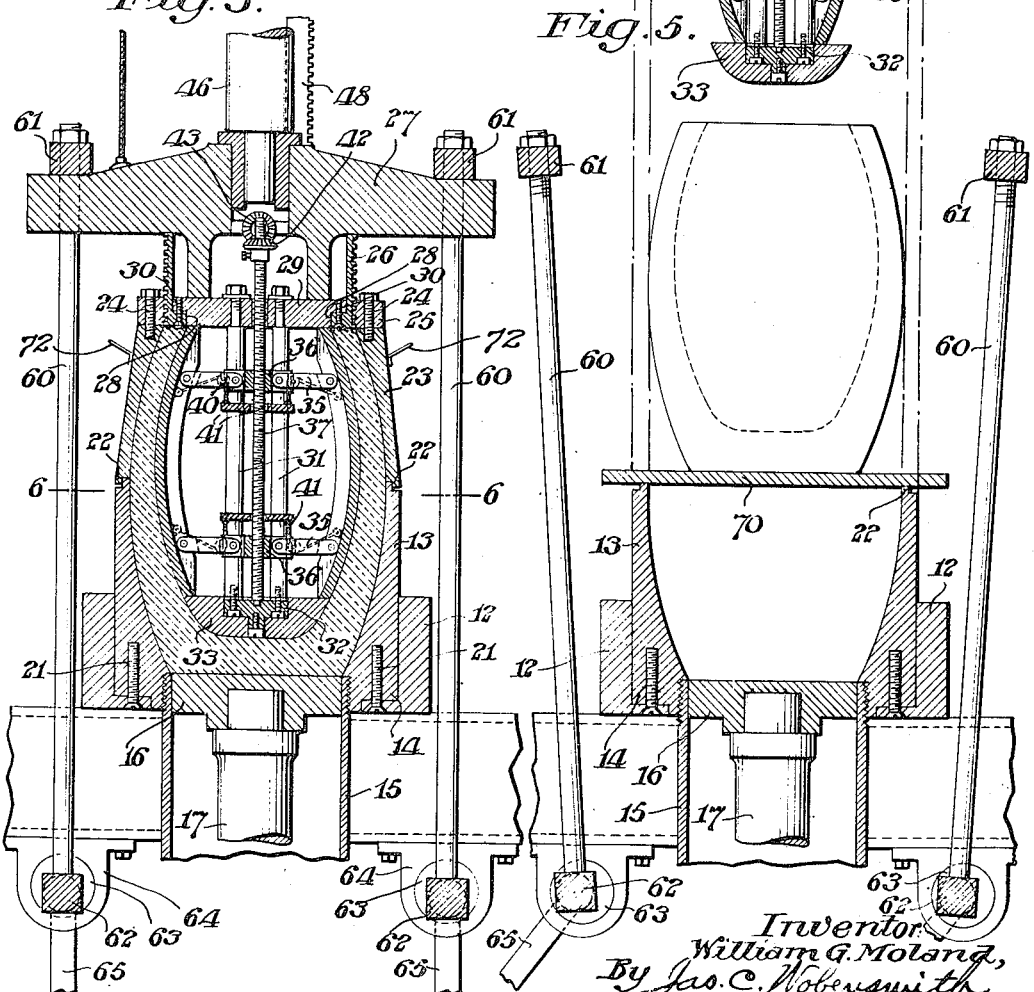
Inventor
William G. Moland,
By Jas. C. Nobenswith
Attorney.

June 10, 1924.  
W. G. MOLAND  
1,497,190  
MACHINE FOR MAKING CRUCIBLES  
Filed July 27, 1921  
3 Sheets—Sheet 3

Inventor:  
William G. Moland,  
By Jas. C. Nobunsmith  
Attorney.

Patented June 10, 1924.

1,497,190

UNITED STATES PATENT OFFICE.

WILLIAM G. MOLAND, OF PHILADELPHIA, PENNSYLVANIA.

MACHINE FOR MAKING CRUCIBLES.

Application filed July 27, 1921. Serial No. 487,866.

*To all whom it may concern:*

Be it known that I, WILLIAM G. MOLAND, a citizen of the United States, residing at Philadelphia, in the county of Philadelphia and State of Pennsylvania, have invented certain new and useful Improvements in Machines for Making Crucibles, of which the following is a specification.

My invention relates to machines for making crucibles, and the object thereof is to provide an efficient machine by means of which crucibles of suitable material may be rapidly and economically formed, which machine will produce crucibles having, when subsequently fired in the usual way, desirable characteristics for their intended purposes.

With such object in view, my invention contemplates the provision of means for receiving a suitable quantity of the material from which the crucibles are formed, such as properly tempered clay or other desired material, the provision of a separable mold, the provision of a collapsible core, the provision of means for securely holding the above mentioned parts in their proper relative positions, the provision of means for forcing the quantity of clay into the mold and around the core, and the provision of means for manipulating the parts for the removal of the crucible from the mold and core in an expeditious manner.

The nature and characteristic features of my invention will be more readily understood from the following description, taken in connection with the accompanying drawings forming part hereof, in which—

Fig. 3 is a vertical central section, enlarged, of the mold and the parts immediately associated therewith, the same being shown in the positions assumed during the forming of the crucible within the mold;

Fig. 4 is a sectional view of the upper portion of the structure shown in Fig. 3, the section being taken transversely to that of Fig. 3 and illustrating certain details of the mechanism;

Fig. 5 is a view similar to Fig. 3, but with the parts separated and in the positions assumed for the removal of the crucible from the mold;

Figure 1:
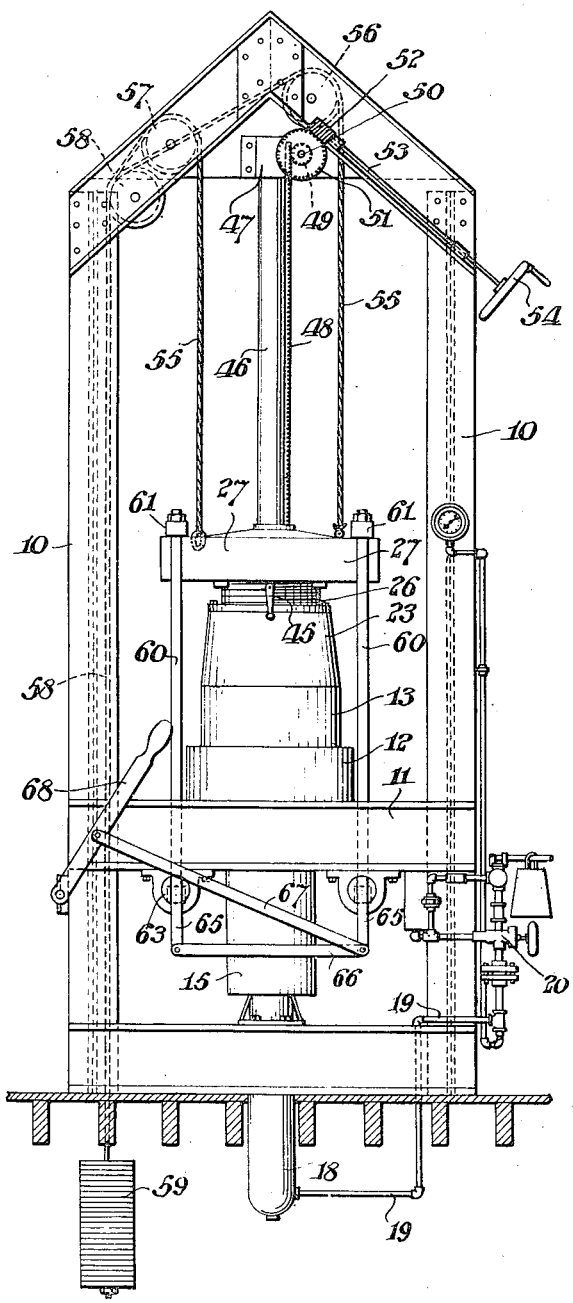
Figure 1 is a front elevational view of a machine embodying the main features of my present invention.
Figure 2:
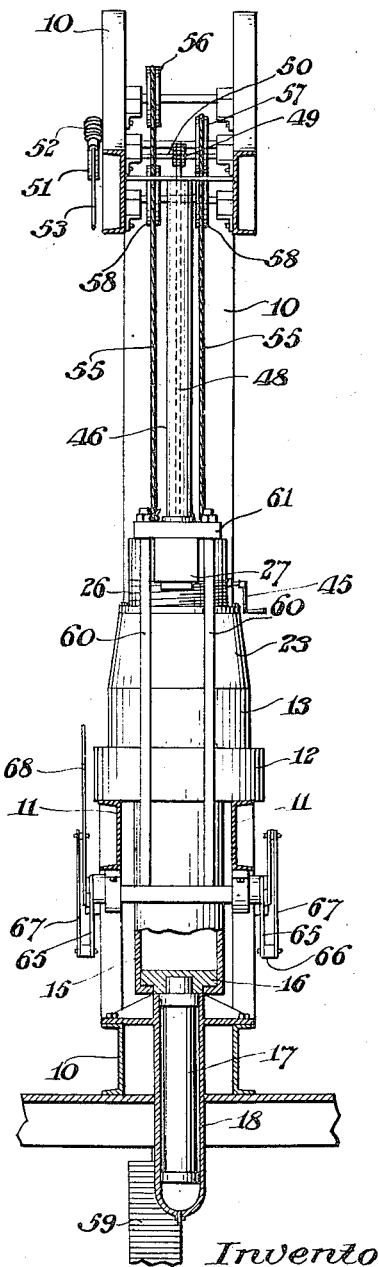
Fig. 2 is a side elevation thereof, partly in section.
Figure 6:
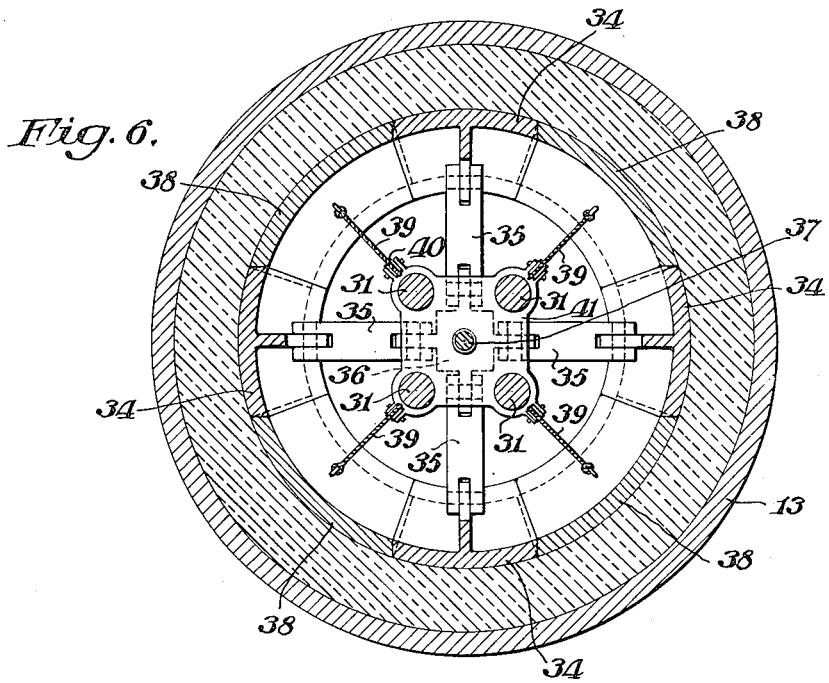
Fig. 6 is a horizontal section, still further enlarged, taken on the line 6—6 of Fig. 3.

Referring to the drawings, in the particular embodiment of my invention therein shown, 10 is the framework of the machine, which may be of any suitable form and arrangement for the support of the operative parts of the machine. As shown in the drawings, the same comprises suitable structural steel members secured to each other in any desired manner to afford the necessary rigidity of the structure. Upon cross beams 11 of the framework 10 there is mounted an annular casting 12, which serves as a means for supporting the lower half 13 of the mold within which the crucible is formed. The annular casting 12 also supports a flange 14 into which is threaded the upper end of a cylinder 15, this cylinder 15 being adapted to initially receive a predetermined quantity of the material of which the crucible is formed. Within the cylinder 15 there is mounted a piston 16 which is seated on the upper end of a plunger 17 which, in turn, is mounted in a hydraulic cylinder 18. Fluid under pressure is supplied to the lower end of the cylinder 18 by means of suitable piping 19 extending from a source of supply and controlled by means of a valve 20 of any preferred type. Suitable auxiliary fittings may be provided in the pipe line 19, such as will be readily understood by those skilled in the art and which need not be specifically referred to.

The lower half 13 of the mold, within which the crucible is formed, may be secured to the casting 12 by means of screws 21, so that the lower half 13 of the mold is in a fixed position with respect to the framework of the machine. The piston 16 and its operating plunger 17 are so arranged as to have such an extent of movement as to bring the upper face of the piston 16 in alinement with the lower end of the lower half 13 of the mold when the material is forced entirely within the mold, as shown in Fig. 3 of the drawings. The upper end of the lower half 13 of the mold terminates at the point of greatest diameter, or, as is commonly termed, at the bilge of the crucible, and is preferably provided, at its upper end, with a shoulder 22 forming an annular recess for seating the lower end of the upper half 23 of the mold.

The upper end of the upper half 23 of the mold is secured by means of bolts 24 to a ring member 25. The ring member 25 is threaded on a sleeve 26 which is carried by a cross-head 27, the arrangement being such that when the upper half 23 of the mold is rotated with respect to the cross-head 27, by reason of the threaded engagement between the ring member 25 and the sleeve 26, the upper half 23 of the mold is vertically retracted with respect to certain other parts hereinafter referred to which are also carried by the cross-head 27.

Figure 7:
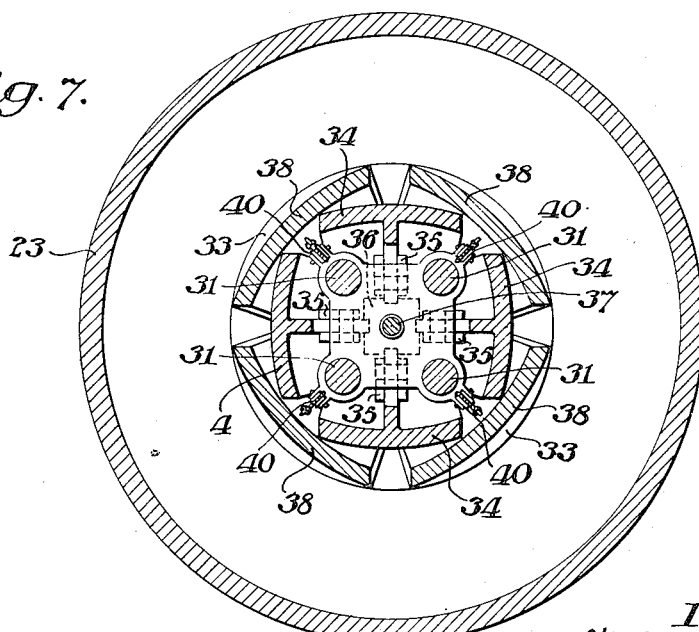
Fig. 7 is a similar horizontal section taken on the line 7—7 of Fig. 5.

The lower end of the threaded sleeve 26 is provided with an internal annular flange 28, which forms a seat for a plate 29 which may be secured in position by means of suitable screws 30. Secured to the plate 29 is a plurality of posts or pillars 31 which carry at their lower ends a block 32 to which is secured a member 33 forming the lower end of the core for forming the interior of the crucible. The body of the core is composed of two sets of retractable segments, the external surfaces of which are shaped to form the interior surface of the crucible. The segments 34 of one set are each connected, near their top and bottom ends, by means of links 35, to cross-heads 36 which are slidably mounted on the pillars 31. The cross-heads 36 are also in threaded engagement with a central rod 37 having right and left hand threads to respectively engage the upper and lower cross-heads 36, the arrangement being such that when the threaded rod 37 is rotated, the cross-heads will be caused to be shifted towards each other and to thereby, through the intermediary of the links 35, cause the segments 34 to be retracted. The segments 38 of the other set are also adapted to be retracted, but to a lesser extent than are the segments 34, so that when all of the segments of the core are retracted, the same will readily pass through the reduced diameter at the interior upper end of the crucible. For the purpose of retracting the segments 38, the same may be connected by means of cables 39 which pass over idler pulleys 40 to plates 41 which are also slidably mounted on the pillars 31 and which are adapted to be encountered by the cross-heads 36 after the same have traveled a slight distance in the act of retracting the segments 34, the segments of each set occupying the positions shown in Fig. 7 of the drawings when the same are completely retracted.

For the purpose of rotating the threaded rod 37, to actuate the cross-heads 36, said rod is provided with a bevel gear 42, mounted at its upper end within the central portion of the cross-head 27. The bevel gear 42 is engaged by a similar bevel gear 43 which is mounted upon the inner end of a horizontal shaft 44 which extends to the exterior of the cross-head 27, and is provided on its upper end with a hand crank 45 for manual actuation by the operator at the proper time.

The cross-head 27 is carried at the lower end of a vertical column 46 which is slidably mounted in a bearing block 47 carried in the upper portion of the framework 10. The column 46 is provided on one side with a rack 48 which is engaged by a suitable gear 49 mounted on a shaft 50, which also carries a worm wheel 51. The worm wheel 51 is engaged by a worm 52 carried at one end of a shaft 53, which extends to the side of the framework 10, and is provided with a hand wheel 54 for manual actuation by the operator. For the purpose of counterbalancing the weight of the cross-head 27 and the parts associated therewith, the same has connected thereto cables 55, passing over sheaves 56, 57 and 58, and thence extending downward through the framework of the machine and carrying counter weights 59 at their lower ends of such mass as to counterbalance the weight of the cross-head 27 and the parts movable therewith.

In order to securely hold the mold together when pressure is imparted to the material within the same, there are provided suitable tension rods 60, arranged in pairs on each side of the mold and connected at their top ends by means of cross bars 61, which are arranged to extend across the top of the projecting ends of the cross-head 27. The lower ends of the tension rods 60 are mounted in shafts 62, the ends of which are mounted in eccentrics 63 which are journalled in suitable bearing blocks 64, each of the eccentrics 63 being provided with a crank arm 65. The crank arms 65 are connected together at their ends by means of a connecting rod 66, and one of the cranks 65 is pivotally connected to one end of a connecting rod 67, the other end of which is pivotally connected to a hand lever 68 whereby, upon the actuation of the hand lever 68, the eccentrics may be rotated to sufficiently relieve the tension upon the rods 60, whereby the bars 61 may be swung outward to release the cross-head 27 at the proper period in the operation of the machine.

The operation of the machine may now be readily understood. The cross-heads 27 and the parts carried thereby being in the raised position at the termination of the previous operation of forming a crucible, access may be had to the lower half of the mold and to the upper end of the cylinder 15. The piston 16 having been retracted to its lowermost position in the cylinder 15, a measured quantity of the material from which the crucible is to be formed is now placed within the cylinder 15. The cross-head 27 and the parts carried thereby are now lowered, by the manual actuation of the hand wheel 54 and the mechanism associated therewith, to cause the upper half 23 of the mold to be brought into engagement with the lower half 13, the segments of the core being previously expanded to their normal positions whereby the exterior surfaces thereof are caused to assume the shape of the interior of the crucible to be formed.

Fluid under pressure is now admitted through the pipe line 19 to the lower end of the cylinder 18, thereby causing the plunger 17 to rise, carrying with it the piston 16 on the upper end thereof, and forcing the material into the space between the exterior surface of the core and the interior surface of the mould sections. When the material is completely forced into said space between the core and the mold sections, the pressure in back of the piston 16 will cause the material to be uniformly distributed and thoroughly compacted into a homogeneous mass, whereby the crucible thus formed will, when subsequently fired, have desirable characteristics of texture not heretofore obtained in the usual manner of forming crucibles of the same general type.

The hand lever 68 is now actuated to release the cross-head 27 and thereby permit the same to be raised. For the purpose of raising the same, the hand wheel 54 is rotated, causing the worm 52 to rotate the worm wheel 51 and thereby rotate the gear 49 which, through its coaction with the rack 48, will cause the column 46 to be moved vertically upward, carrying with it the cross-head 27, the upper half of the mold, and the core in its expanded condition. The formed crucible will also be carried upward on the core, causing the same to leave the lower half 13 of the mold. The cross-head at this time will be raised until the lower end of the crucible is carried a slight distance above the upper end of the lower half 13 of the mold. The board 70 is now placed upon the upper end of the lower half 13 of the mold, and the column 46 is then lowered sufficiently to permit the bottom surface of the crucible to rest upon said board 70. The upper half 23 of the mold is now manually rotated with respect to the cross-head 27 for which purpose handles 72 may be provided, and on account of the threaded engagement of the collar 25 with the sleeve 26, the upper half 23 of the mold will be caused to be retracted upward away from the crucible, which is now resting upon the board 70 and is surrounding the core in its expanded condition.

The crank 45 is now rotated, and, through the intermediary of the shaft 44 and the bevel gears 43 and 42, the threaded rod 37 is rotated, whereby the cross-heads 36 will be advanced towards each other on the pillars 31, causing the segmental members 34 of the core to be retracted, and after the same have been retracted a sufficient distance to clear the edges of the other segmental members 38, the cross-heads 36 will encounter the members 41, causing the same also to be actuated towards each other upon the pillars 31. The cables 39, which are connected at their respective ends to the segmental members 38 and the members 41, will cause the retraction of the segmental members 38, until all the segmental members of the core are retracted sufficiently to permit the same to be withdrawn through the constricted opening at the top of the crucible, after which the cross-head 27 may be again raised a further distance by the actuation of the hand wheel 54, to withdraw the core from the interior of the crucible, permitting the same to be free upon the board 70, whereupon the crucible may be removed for the firing or other necessary subsequent operations. The machine will now be in position for a repetition of the operation.

It will be seen that there is thus provided a machine particularly adaptable for forming crucibles having a bilged shape, but which machine, however, is also adaptable for making crucibles and the like of other desired shapes, in which machine the crucibles may be rapidly and economically formed and will be of a more homogeneous texture than has been possible by the methods of manufacture heretofore followed, and which crucibles, when so formed, will be uniform in shape and quality.

Having thus described the nature and characteristic features of my invention, what I claim as new and desire to secure by Letters Patent, is:

1. In a machine for forming crucibles and the like having a bilged shape, the combination of a separable mold of fixed circumferential dimensions, a collapsible bilge shaped core mechanically associated therewith, and means for forcing a measured quantity of material into the space betwen the core and the mold and for thereafter compressing the same within said space to thereby form the crucible.

2. In a machine for forming crucibles and the like, having a bilged shape, the combination of a separable mold of fixed circumferential dimensions, a collapsible bilge shaped core mechanically associated therewith, means for forcing a measured quantity of material into the space between the core and the mold and for thereafter compressing the same within said space to thereby form the crucible, means for holding the mold in assembled condition when the pressure is imparted during the forming operation, and means for separating the mold.

3. In a machine for forming crucibles and the like, having a bilged shape the combination of a mold separable in a horizontal plane of the large diameter of the crucible, a collapsible bilge shaped core mechanically associated therewith, means for forcing a measured quantity of material into the space between the core and the mold and for thereafter compressing the same within said space to thereby form the crucible, means for holding the mold in assembled condition when the pressure is imparted during the forming operation, means for releasing said holding means, means for separating the mold, and means for withdrawing the core from the formed crucible.

4. In a machine for forming crucibles and the like, having a bilged shape the combination of a mold separable in a horizontal plane of the large diameter of the crucible, a collapsible bilge shaped core mechanically associated therewith, means for forcing a measured quantity of material into the space between the core and the mold and for thereafter compressing the same within said space to thereby form the crucible, means for holding the mold in assembled condition when the pressure is imparted during the forming operation, manually operable means for releasing said holding means, manually operable means for separating the mold, and manually operable means for withdrawing the core from the formed crucible.

5. In a machine for forming crucibles and the like having a bilged shape, the combination of a separable mold of fixed circumferential dimensions, a collapsible bilge shaped core mechanically associated therewith, means for forcing a measured quantity of material into the space between the core and the mold and for thereafter compressing the same within said space to thereby form the crucible, means for separating the mold, means for collapsing the core, and means for withdrawing the core in its collapsed condition from the formed crucible.

6. In a machine for forming crucibles and the like having a bilged shape, the combination of a mold separable in a horizontal plane of the large diameter of the crucible, a collapsible bilge shaped core mechanically associated therewith, means for forcing a measured quantity of material into the space between the core and the mold and for thereafter compressing the same within said space to thereby form the crucible, means for holding the mold in assembled condition when the pressure is imparted during the forming operation, means for separating the mold, means for collapsing the core, and means for withdrawing the core in its collapsed condition from the formed crucible.

7. In a machine for forming crucibles and the like having a bilged shape, the combination of a separable mold, a bilge shaped core mechanically associated therewith having segmental members adapted to be retracted whereby the same may be withdrawn through the constricted opening at the upper end of the crucible, means for forcing a measured quantity of material into the space between the core and the mold and for thereafter compressing the same within said space to thereby form the crucible, means for holding the mold in assembled condition when the pressure is imparted during the forming operation, means for separating the mold, means for retracting the segmental members of the core, and means for withdrawing the core in its retracted condition from the formed crucible.

8. In a machine for forming crucibles and the like having a bilged shape, the combination of a mold separable in a horizontal plane of the large diameter of the crucible, a bilge shaped core mechanically associated therewith having segmental members adapted to be retracted whereby the same may be withdrawn through the constricted opening at the upper end of the crucible, means for forcing a measured quantity of material into the space between the core and the mold and for thereafter compressing the same within said space to thereby form the crucible, means for holding the mold in assembled condition when the pressure is imparted during the forming operation, means for releasing said holding means, means for separating the mold, means for retracting the segmental members of the core, and means for withdrawing the core in its retracted condition from the formed crucible.

9. In a machine for forming crucibles and the like having a bilged shape, the combination of a mold separable in a horizontal plane of the large diameter of the crucible, a bilge shaped core mechanically associated therewith having segmental members adapted to be retracted whereby the same may be withdrawn through the constricted opening at the upper end of the crucible, means for forcing a measured quantity of material into the space between the core and the mold and for thereafter compressing the same within said space to thereby form the crucible, means for holding the mold in assembled condition when the pressure is imparted during the forming operation, manually operable means for releasing said holding means, manually operable means for separating the mold, manually operable means for retracting the segmental members of the core, and manually operable means for withdrawing the core in its retracted condition from the formed crucible.

10. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, a collapsible core carried by said movable member, and means for actuating said movable member.

11. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, and a collapsible core carried by said movable member.

12. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, and a collapsible core carried by said movable member.

13. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, and a collapsible core carried by said movable member.

14. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, and means for collapsing said core.

15. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said member, and manually operable means for collapsing said core.

16. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, means for collapsing said core, and means for actuating said movable member.

17. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, manually operable means for collapsing said core, and manually operable means for actuating said movable member.

18. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, means for collapsing said core, means for actuating said movable member, and means for counter-balancing the weight of said movable member and the parts carried thereby.

19. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, manually operable means for collapsing said core, manually operable means for actuating said movable member, and means for counterbalancing the weight of said movable member and the parts carried thereby.

20. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, means for collapsing said core, means for actuating said movable member, means for counterbalancing the weight of said movable member and the parts carried thereby, and means for holding said movable member in fixed position when the two parts of the mold are assembled.

21. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, manually operable means for collapsing said core, manually operable means for actuating said movable member, means for counterbalancing the weight of said movable member and the parts carried thereby, and means for holding said movable member in fixed position when the two parts of the mold are assembled.

22. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, means for collapsing said core, means for actuating said movable member, means for counter-balancing the weight of said movable member and the parts carried thereby, means for holding said movable member in fixed position when the two parts of the mold are assembled, and means for releasing said holding means.

23. In a machine for forming crucibles and the like, the combination of a two-part separable mold, means for supporting the part of said mold for forming the lower exterior surface of the crucible in a fixed position, a cylinder adapted to receive a measured quantity of the material of which the crucible is formed, said cylinder communicating with the interior portion of the mold, a piston movable in said cylinder adapted to force the material into the mold, means for actuating said piston, a movable member for supporting the part of the mold for forming the upper exterior surface of the crucible, connections between said part of the mold and said movable member permitting relative movement therebetween, a collapsible core carried by said movable member, manually operable means for collapsing said core, manually operable means for actuating said movable member, means for counterbalancing the weight of said movable member and the parts carried thereby, means for holding said movable member in fixed position when the two parts of the mold are assembled, and manually operable means for releasing said holding means.

24. In a machine for forming crucibles and the like having a bilged interior shape, the combination, with a mold for forming the exterior of the crucible, of a collapsible core having a bilge shape and comprising a plurality of segments, means for retracting one series of said segments to a certain extent, and means coacting therewith for retracting the other series of said segments to a lesser extent, the means for retracting the first mentioned series comprising links pivotally connected at their outer ends near the respective ends of said segments and connected at their inner ends to movable cross-heads.

25. In a machine for forming crucibles and the like having a bilged interior shape, the combination, with a mold for forming the exterior of the crucible, of a collapsible core having a bilge shape and comprising a plurality of segments, means for retracting one series of said segments to a certain extent, and means coacting therewith for retracting the other series of said segments to a lesser extent, the means for retracting the first mentioned series comprising links pivotally connected at their outer ends near the respective ends of said segments and connected at their inner ends to cross-heads, and means for moving said cross-heads towards each other.

26. In a machine for forming crucibles and the like having a bilged interior shape, the combination, with a mold for forming the exterior of the crucible, of a collapsible core having a bilge shape and comprising a plurality of segments, means for retracting one series of said segments to a certain extent, and means coacting therewith for retracting the other series of said segments to a lesser extent, the means for retracting the first mentioned series comprising links pivotally connected at their outer ends near the respective ends of said segments and connected at their inner ends to cross-heads, and manually operable means for moving said cross-heads towards each other.

27. In a machine for forming crucibles and the like having a bilged interior shape, the combination, with a mold for forming the exterior of the crucible, of a collapsible core having a bilge shape and comprising a plurality of segments, means for retracting one series of said segments to a certain extent, and means coacting therewith for retracting the other series of said segments to a lesser extent, the means for retracting the first mentioned series comprising links pivotally connected at their outer ends near the respective ends of said segments and connected at their inner ends to cross-heads, and manually operable means for moving said cross-heads towards each other, and the means for retracting the second mentioned set of segments comprising cables connected near the respective ends of said segments, said cables extending to movable members adapted to be encountered and actuated by the cross-heads to which the links for operating the first mentioned set of segments are connected.

In testimony whereof, I have hereunto signed my name.

WILLIAM G. MOLAND.